(12) United States Patent
Chen

(10) Patent No.: US 7,599,195 B2
(45) Date of Patent: Oct. 6, 2009

(54) SHOCK ABSORBER ASSEMBLY AND PORTABLE COMPUTER UTILIZING THE SAME

(75) Inventor: Yi-Jen Chen, Luzhou (TW)

(73) Assignee: ASUSTeK Computer Inc., Taipei (TW)

( * ) Notice: Subject to any disclaimer, the term of this patent is extended or adjusted under 35 U.S.C. 154(b) by 342 days.

(21) Appl. No.: 11/603,032

(22) Filed: Nov. 22, 2006

(65) Prior Publication Data

US 2007/0064405 A1 Mar. 22, 2007

Related U.S. Application Data

(63) Continuation-in-part of application No. 11/051,374, filed on Feb. 4, 2005, now abandoned.

(30) Foreign Application Priority Data

Aug. 2, 2004 (TW) ................................ 93123075 A

(51) Int. Cl.
*H05K 7/02* (2006.01)

(52) U.S. Cl. .................. 361/810; 361/801; 361/732; 361/752; 361/759

(58) Field of Classification Search .......... 361/801, 361/810, 778, 732, 752, 759, 757; 206/706, 206/707, 701; 228/57
See application file for complete search history.

(56) References Cited

U.S. PATENT DOCUMENTS

| 4,251,853 | A | 2/1981 | Sites |
| 4,980,786 | A | 12/1990 | O'Sullivan et al. |
| 5,462,442 | A * | 10/1995 | Umemura et al. ............. 439/69 |
| 5,535,092 | A | 7/1996 | Bang |
| 5,550,712 | A | 8/1996 | Crockett |
| 5,737,304 | A | 4/1998 | Soga et al. |
| 5,956,314 | A * | 9/1999 | Ishimatsu et al. ........... 720/693 |
| 6,477,042 | B1 * | 11/2002 | Allgeyer et al. ............. 361/685 |
| 6,683,840 | B2 * | 1/2004 | Shin .......................... 720/698 |
| 6,760,219 | B2 * | 7/2004 | Hood et al. ................. 361/685 |
| 6,823,527 | B2 | 11/2004 | Liao et al. |
| 2003/0161253 | A1 * | 8/2003 | Liao et al. .................. 369/263 |

* cited by examiner

*Primary Examiner*—Dean A. Reichard
*Assistant Examiner*—Hoa C Nguyen
(74) *Attorney, Agent, or Firm*—Muncy, Geissler, Olds & Lowe, PLLC

(57) ABSTRACT

A portable computer and a shock absorber assembly thereof. The portable computer includes a body, a hard disc drive, a supporting member, an isolator, a frame, and a damper. The hard disc drive is disposed in the body. The supporting member is disposed on the hard disc drive. The isolator is disposed on the supporting member. The frame is disposed on the hard disc drive. The damper is disposed on the frame. Thus, the hard disc drive is connected to the body by the isolator, and connected to the frame by the damper. As a result, the vibration generated by the hard disc drive is isolated to avoid affecting the other portions of the portable computer.

10 Claims, 8 Drawing Sheets

SHOCK ABSORBER ASSEMBLY AND PORTABLE COMPUTER UTILIZING THE SAME

This application is a Continuation-In-Part of Application Ser. No. 11/051,374 filed on Feb. 4, 2005 now abandoned, the entire contents of which are hereby incorporated by reference and for which priority is claimed under 35 U.S.C.§120.

BACKGROUND

1. Field of Invention

The invention relates to a portable computer, and in particular, to a portable computer with a shock absorber assembly that improves shockproof effect thereof.

2. Related Art

Conventional portable computers often include a hard disc drive (HDD) and CD-ROM (or DVD-ROM) disposed therein by cushioning foam.

The cushioning foam cannot, however, absorb large vibrations generated by the drive rotation with high-speed. Thus, the vibration would transmit to the display panel and affects users.

Moreover, the cushioning foam cannot absorb larger shocks immediately from external sources during portable computers received a dash. Thus, the HDD and CD-ROM (or DVD-ROM) may malfunction or suffer damage.

SUMMARY OF THE INVENTION

In view of the foregoing, the invention provides a portable compute, so as to prevent the vibration generated by the hard disc drive to affect the other portions of the portable computer.

Accordingly, an embodiment of the invention provides a portable computer including a body, a module, a supporting member, an isolator, a frame, and a damper. The module is disposed in the body. The supporting member is disposed on the module. The isolator is disposed on the supporting member. The frame is disposed on the module. The damper is disposed on the frame. The module is connected to the body by the isolator, and connected to the frame by the damper.

Note that coefficient of damping of the isolator is high than that of the damper, and coefficient of elasticity of the isolator is lower than that of the damper. Hence, the vibration generated by the module is isolated to avoid affecting the other portions of the portable computer. And the vibration is transmitted to the frame quickly through the damper without staying in the module. The isolator also isolates larger shocks immediately from external sources during portable computers received a dash. Thus, the module, such as HDD and CD-ROM (or DVD-ROM), would not malfunction or suffer damage.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus are not limitative of the invention, and wherein:

FIG. 1c is a schematic view of the assembled portable computer in FIG. 1a;

FIG. 2a is a schematic view of a combination of the module, a supporting member, and an isolator in FIG. 1a;

FIG. 2b is a schematic view of a combination of the frame and a damper in FIG. 1a;

FIGS. 3b and 3c are schematic views of a mathematical mode of the portable computer in FIG. 1a.

DETAILED DESCRIPTION OF THE INVENTION

Figure 1A:
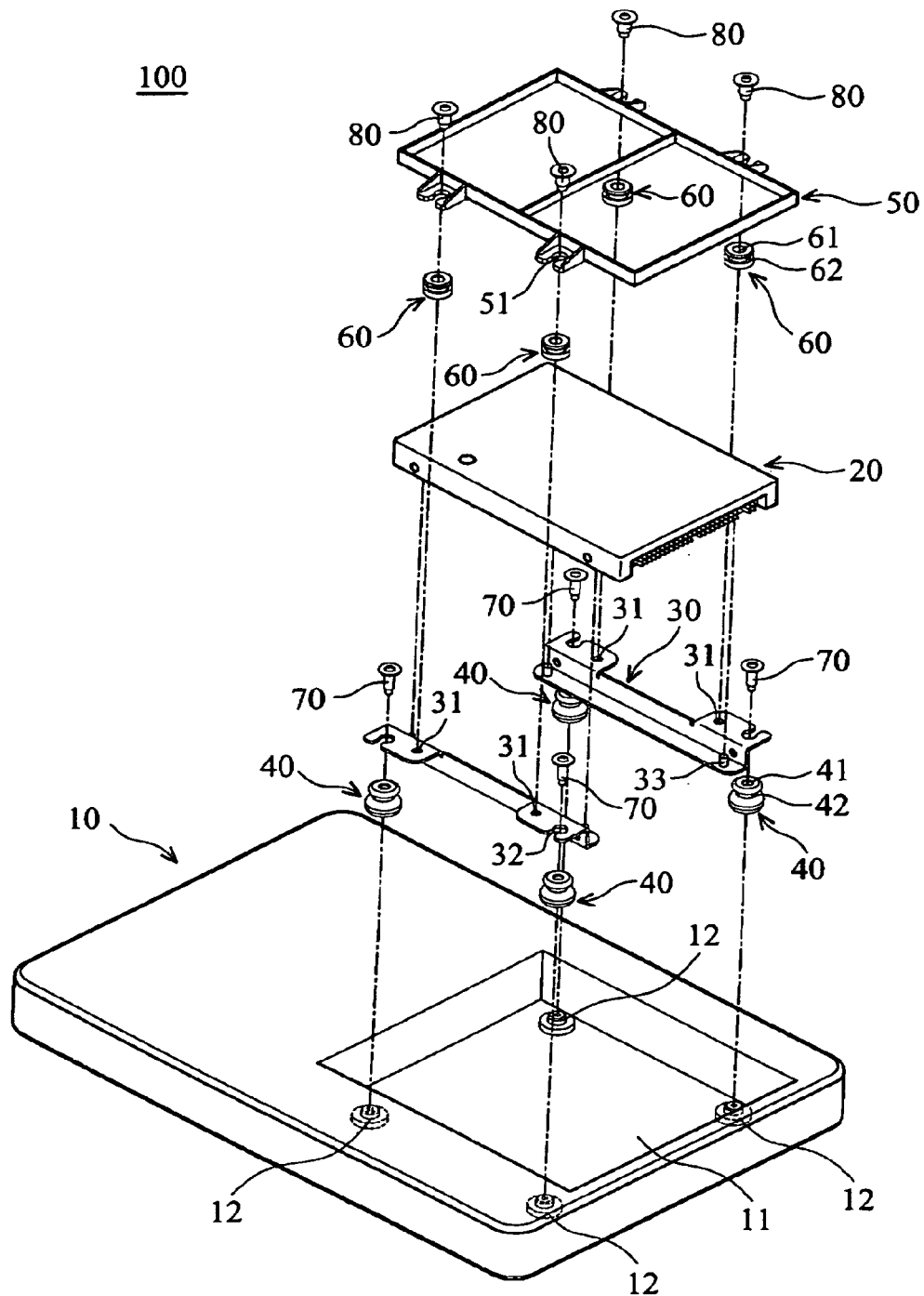
FIG. 1a is an exploded view of a portable computer as disclosed in a first embodiment of the invention.
Figure 1B:
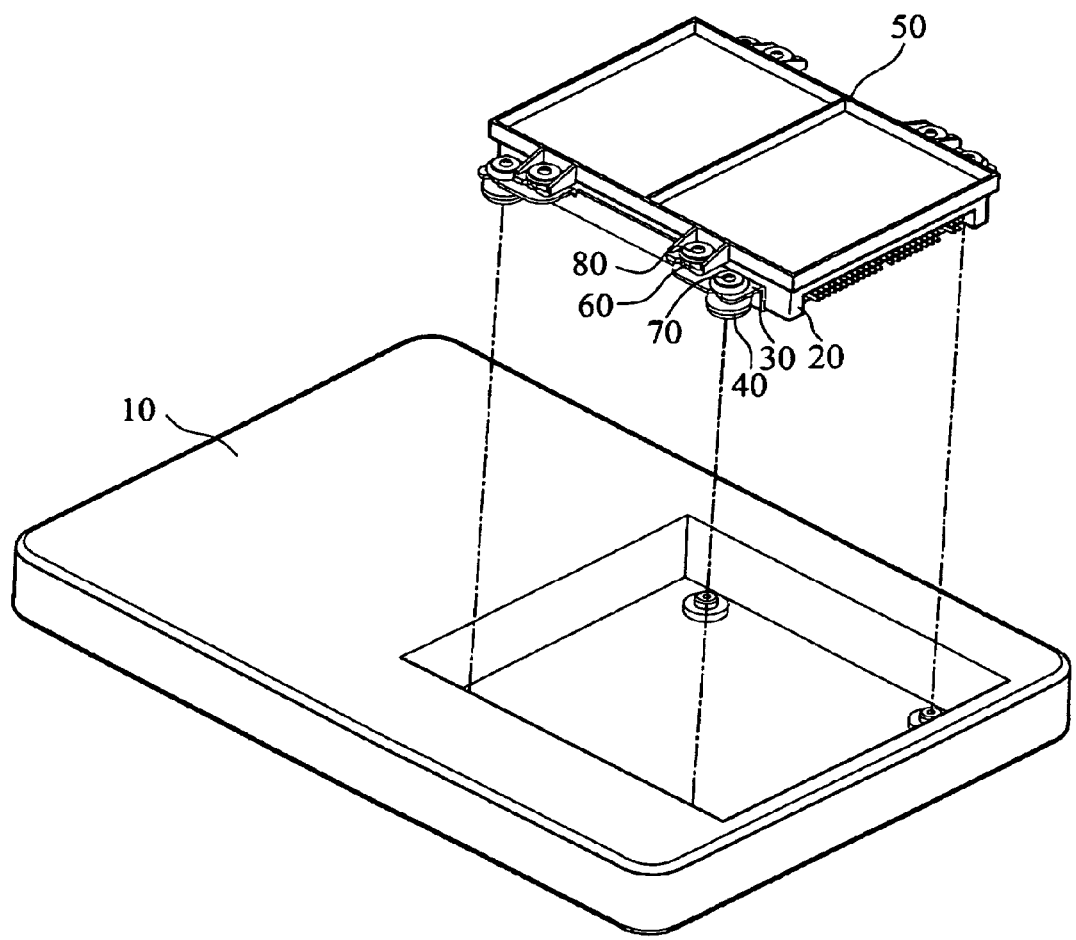
FIG. 1b is another exploded view of the portable computer in FIG. 1a, wherein a frame and a module are assembled.
Figure 1C:
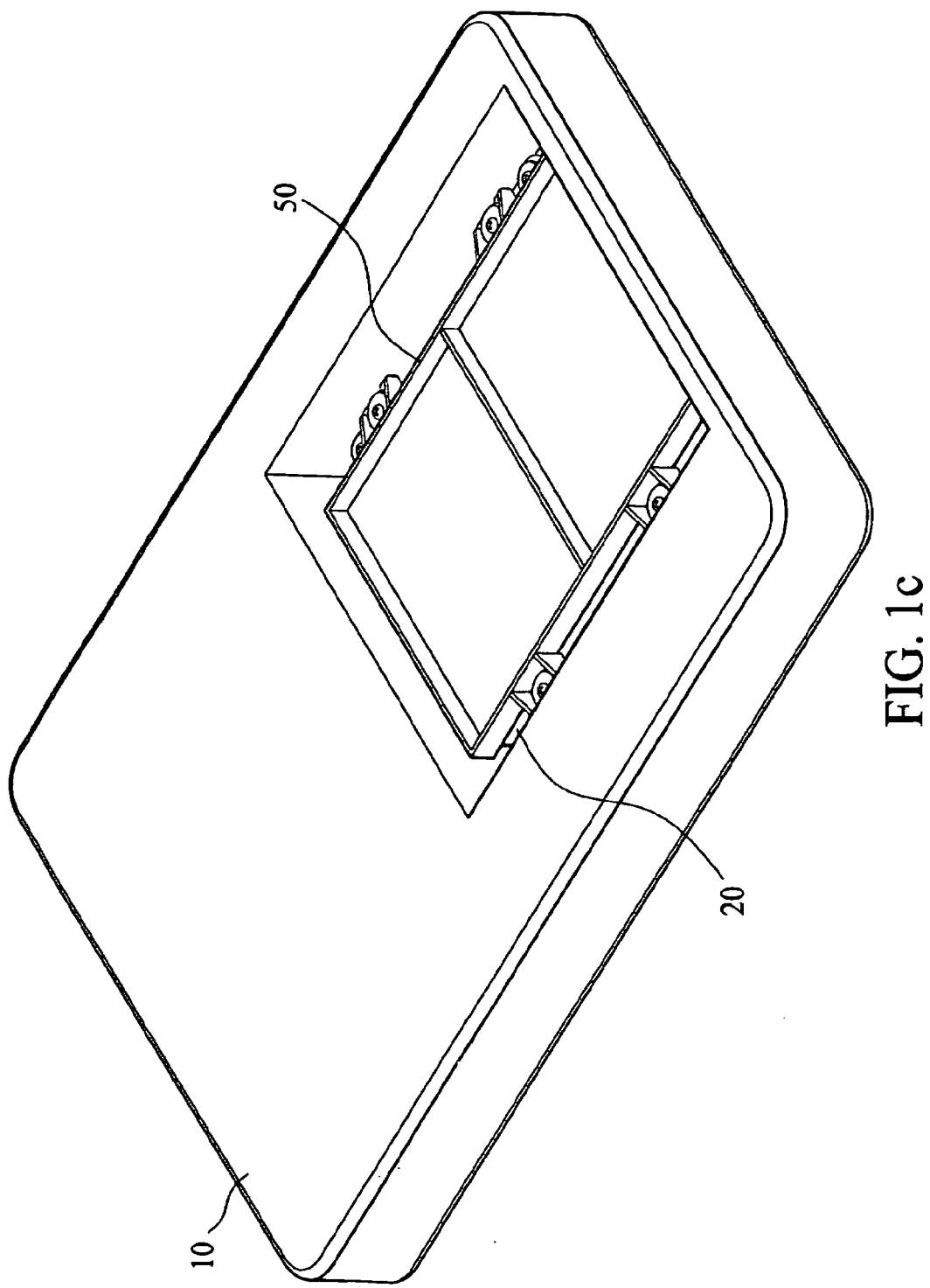

FIGS. 1a-1c are schematic views of a portable computer 100 as disclosed in a first embodiment of the invention. The portable computer 100 includes a body 10, a module 20, two supporting members 30, four isolators 40, a frame 50, four dampers 60, four first fixed members 70, and four second fixed members 80. The supporting members 30, the isolators 40, the frame 50, the dampers 60, the first fixed member 70, and the second fixed members 80 constitute a shock absorber assembly of an embodiment of the invention.

The body 10 is a basic component of the portable computer 100, and has a receiving portion 11 with four first screw holes 12 therein. Additionally, the body 10 includes other devices required by the portable computer 100. Such devices are not directly related to this invention, and detailed description thereof is thus omitted.

The module 20 is disposed in the body 10. Specifically, the module 20 is connected to the body 10 by the isolators 40 to isolate shock or vibration thereof. Furthermore, it is understood that the module 20 may be a hard disc drive, CD-ROM, or DVD-ROM that generates vibration and requires isolation from the exterior.

Each supporting member 30 supports the module 20, and is disposed thereon. Each supporting member 30 is shaped like a support to receive the isolators 40. Additionally, each supporting member 30 is formed with two screw holes 31 and two notches 32. Each notch 32 is C-shaped to prevent the isolator 40 from separation therefrom. Furthermore, each supporting member 30 includes two posts 33 corresponding to holes (not shown) at the bottom of the module 20. Each supporting member 30 is fixed to the module 20 by the posts 33 in the holes of the module 20.

Each isolator 40 includes a through hole 41 at its center and a groove 42 at its periphery. Each isolator 40 is disposed on the supporting member 30 by the notch 32 combining with the groove 42. Furthermore, each isolator 40 is material with high coefficient of damping (C), such as silica gel. Thus, when the computer receives an external shock, the isolators 40 effectively isolate the shock, preventing the module 20 from damage. Also, the vibration generated by the module 20 is isolated to avoid affecting the other portions or elements of the portable computer. Additionally, as shown in FIG. 1a, each isolator 40 may be a hollow cylindrical pad with maximized thickness to enhance the coefficient of damping. That is, the thickness in the radial direction of the cylindrical isolator 40 is maximized preferably.

The frame 50 absorbs vibration from the portable computer 100, and is disposed on the module 20. The frame 50 includes two notches 51 on both sides. Each notch 51 is C-shaped to prevent the damper 60 from separating from the notch 51. It is understood that the frame 50 is preferably made of metal with high mass, such that most vibration energy of the module 20 is concentrated on the frame 50.

Each damper 60 includes a through hole 61 at its center and a groove 62 at its periphery. Each damper 60 is disposed on the frame 50 by the notch 51 combining with the groove 62. Furthermore, each damper 60 is material with high coefficient of elasticity (K). Thus, the vibration of the module 20 is transmitted to the frame 50 through the dampers 60 to avoid the vibration remaining in the module 20 and affect the operation of the module 20. Additionally, as shown in FIG. 1a, each damper 60 may be a hollow cylindrical pad with a minimized thickness to reduce damping.

As shown in FIG. 1a, each first fixed member 70 is a screw entering into the screw hole 13 of the body 10 via the through hole 41 of the isolator 40. Thus, each first fixed member 70 passes through the isolator 40 to fix the module 20 in the body 10. Each second fixed member 80 is a screw entering into the screw hole 31 of the supporting member 30 via the through hole 61 of the damper 60. Thus, each second fixed member 80 passes through the damper 60 to fix the frame 50 in the supporting member 30.

Figure 2A:
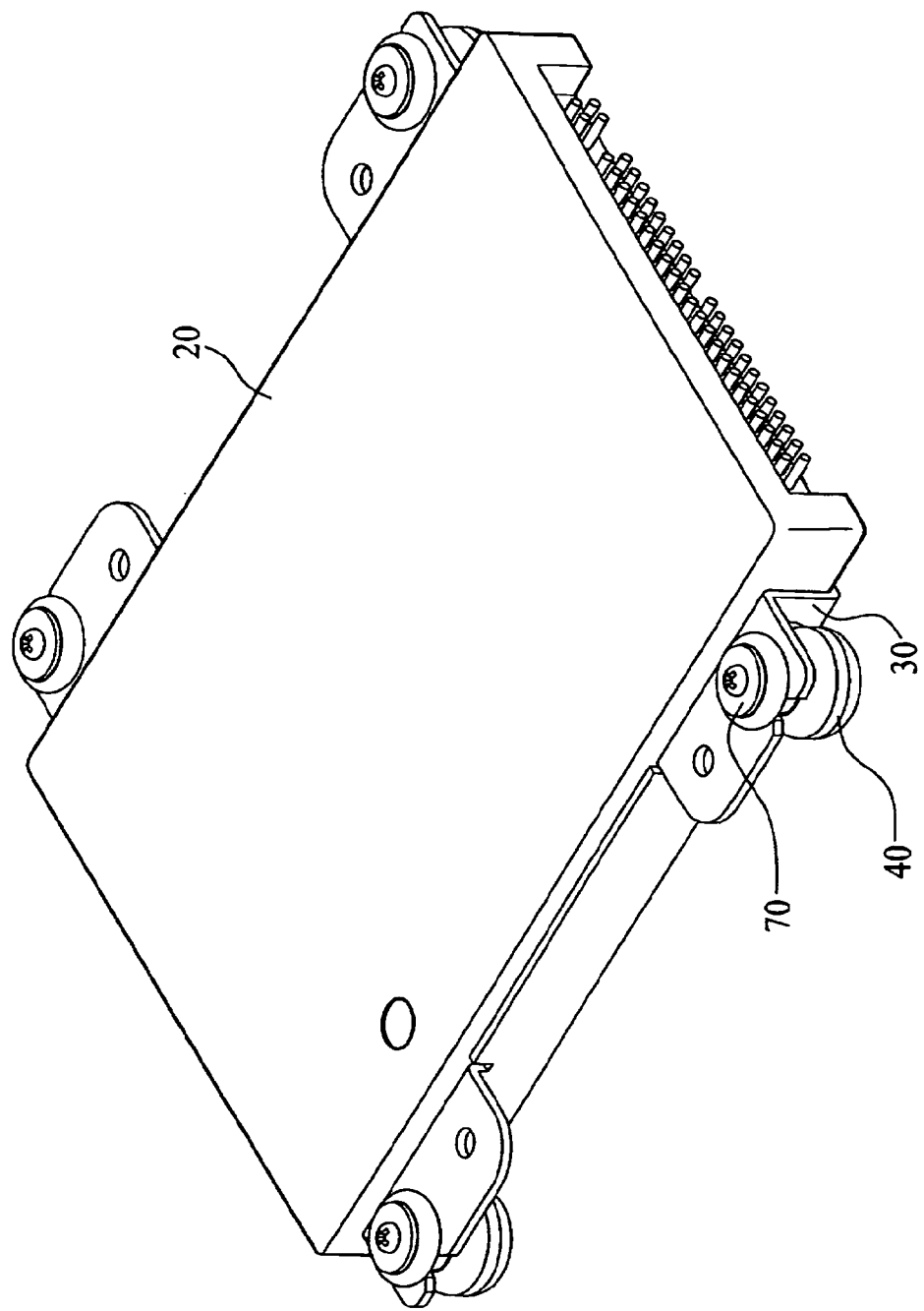
Figure 2B:
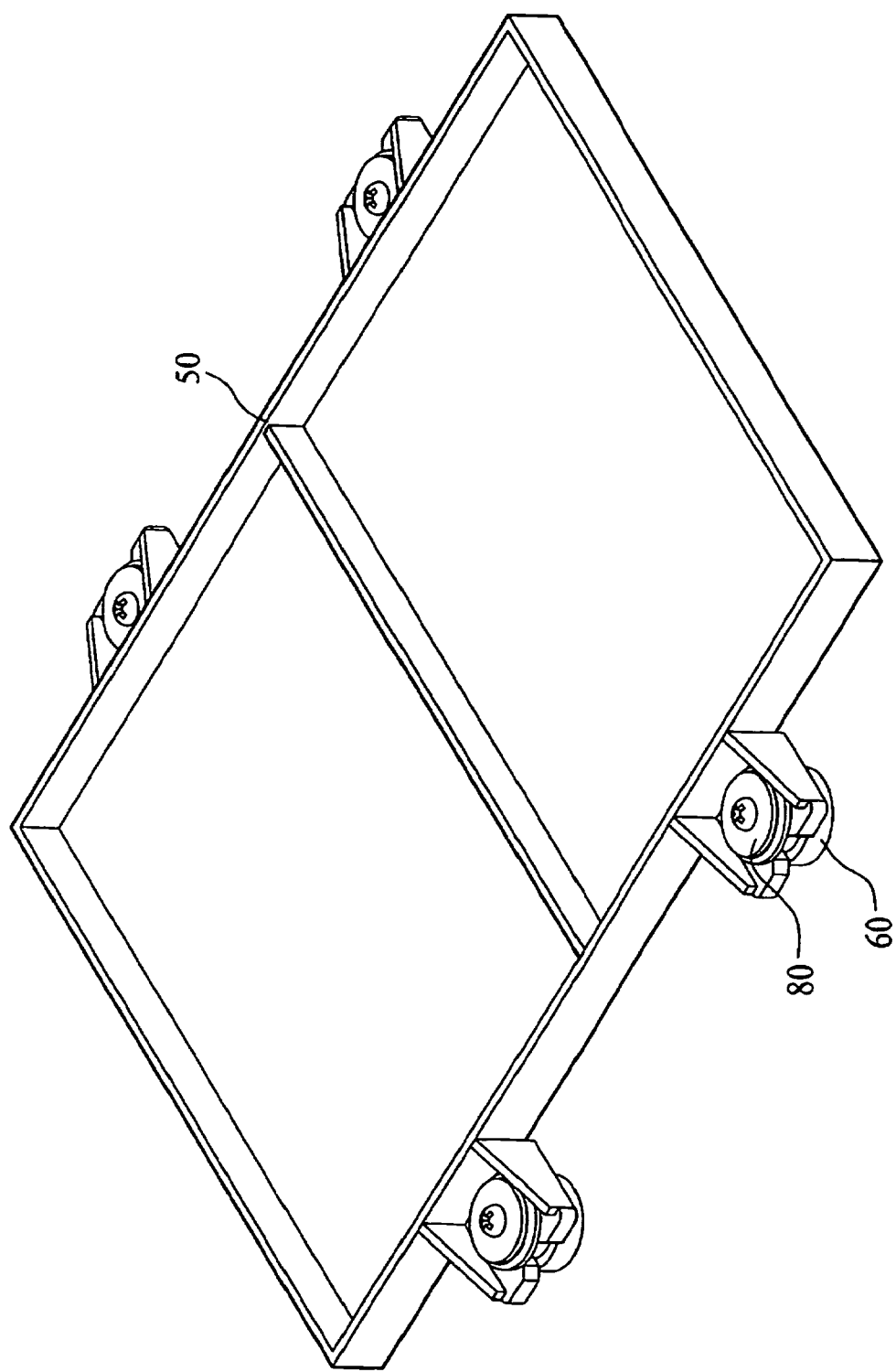

During assembly of the portable computer 100, the dampers 60 are disposed on the frame 50 as shown in FIG. 2b. Then, the second fixed members 80 fix the frame 50 in combination with the dampers 60 to the supporting members 30. The supporting members 30 are then combined with the module 20 and the isolators 40, as shown in FIG. 1b. Finally, the first fixed members 70 fix the module 20 in combination with the frame 50 to the body 10, as shown in FIG. 1c.

Figure 3A:
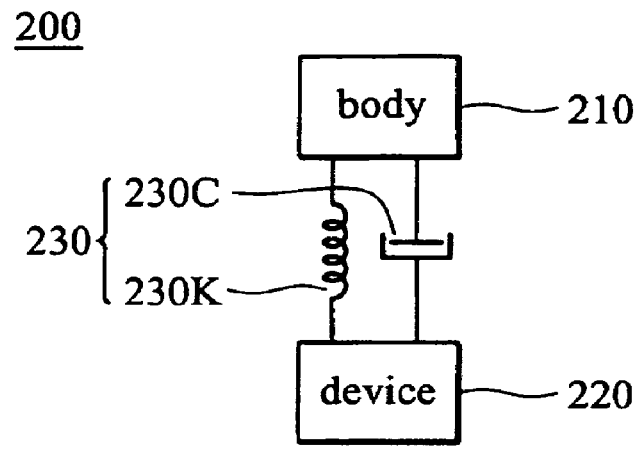
FIG. 3a is a schematic view of a mathematical mode of a conventional portable computer.
Figure 3B:
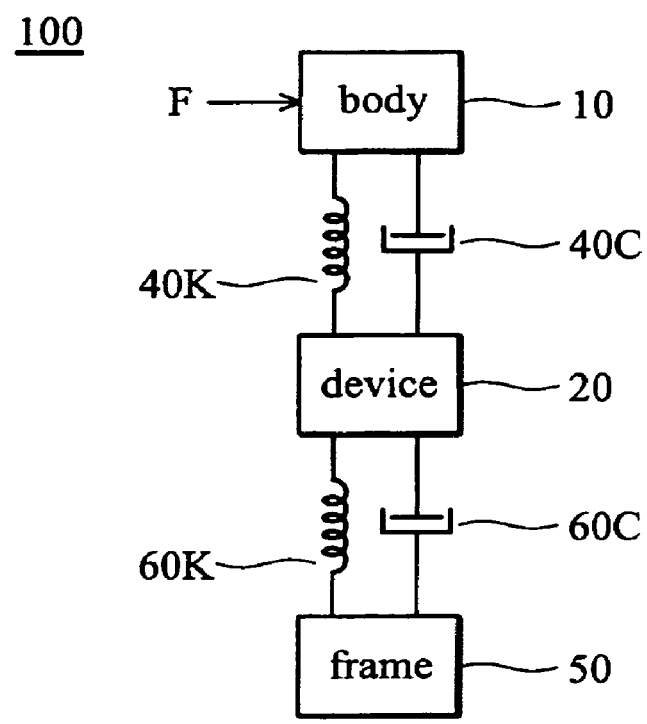
Figure 3C:
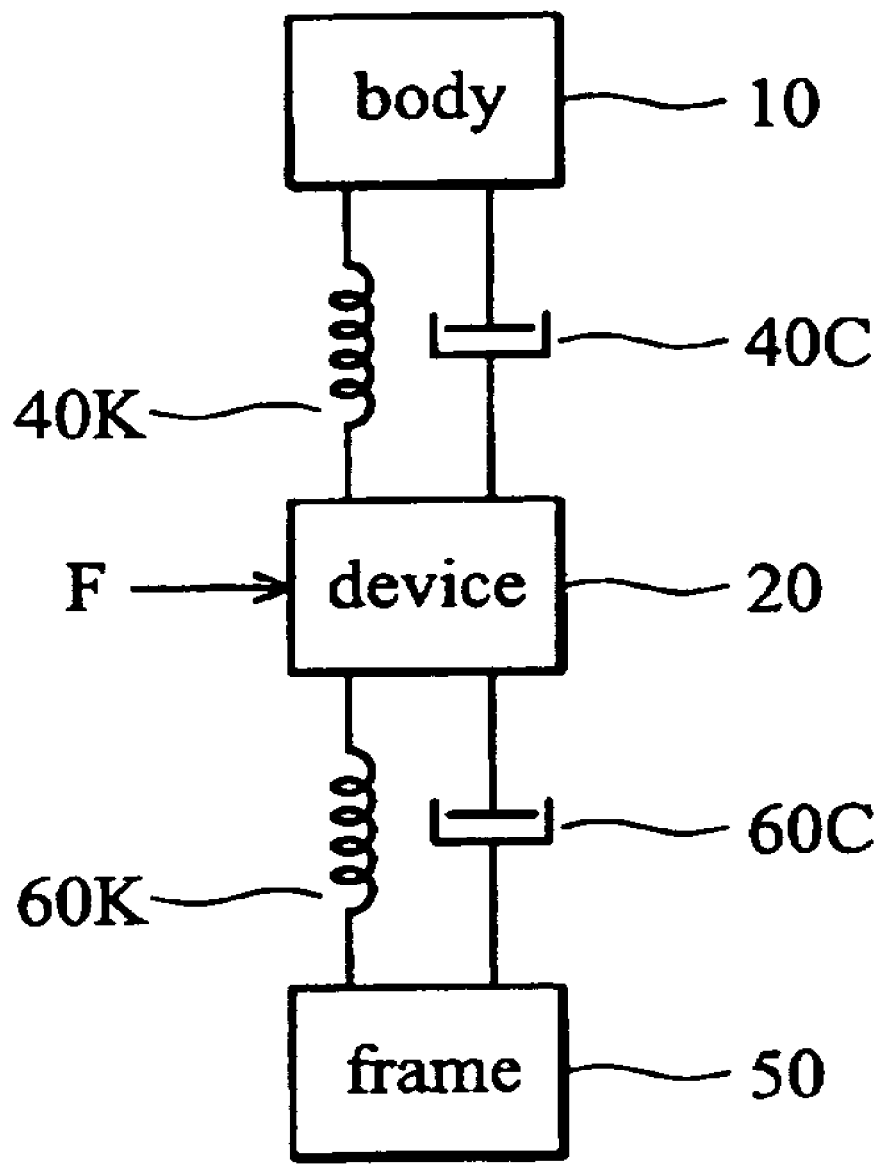

FIG. 3a is a schematic view of a mathematical mode of a conventional portable computer 200 comprising a body 210, a module 220, and cushioning foam 230. The module 220 is disposed on the body 210 by the cushioning foam 230, whereby vibration between the module 220 and the body 210 is isolated by the damping 230c and the elasticity 230k of the cushioning foam 230. Thus, isolation is limited. FIGS. 3b and 3c are schematic views of a mathematical mode of a portable computer 100 as disclosed in embodiments of the invention. The module 20 is connected to the body 10 by the isolators 40, and to the frame 50 by the dampers 60. When external shock occurs, vibration between the module 20 and the body 10 is isolated by the damping 40c and the elasticity 40k of the isolators 40 as shown in FIG. 3b. Thus, the shock is isolated effectively by the isolators 40 to prevent the module 20 from damages. Furthermore, when the module 20 generates vibration during high-speed rotation, the vibration is transmitted to the frame 50 quickly by the damping 60c and the elasticity 60k of the dampers 60 to reduce the vibration of the module 20. That is, since most of the vibration energy of the module 20 is concentrated on the frame 50 so as to reduce the vibration of the module 20. Thus, the module 20 can be stably operated. Moreover, since the module 20 is connected to the body 10 by the isolators 40, the module 20 is not directly in contact with the body 10 no matter what position of the portable computer 100 is. Thus, the module 20 is stably operated and the resonance and noise of the portable computer is improved.

It is understood that, while the shock absorber assembly is here described in application to a portable computer, it is not limited thereto, and may be applied to other electronic apparatuses.

Figure 4:
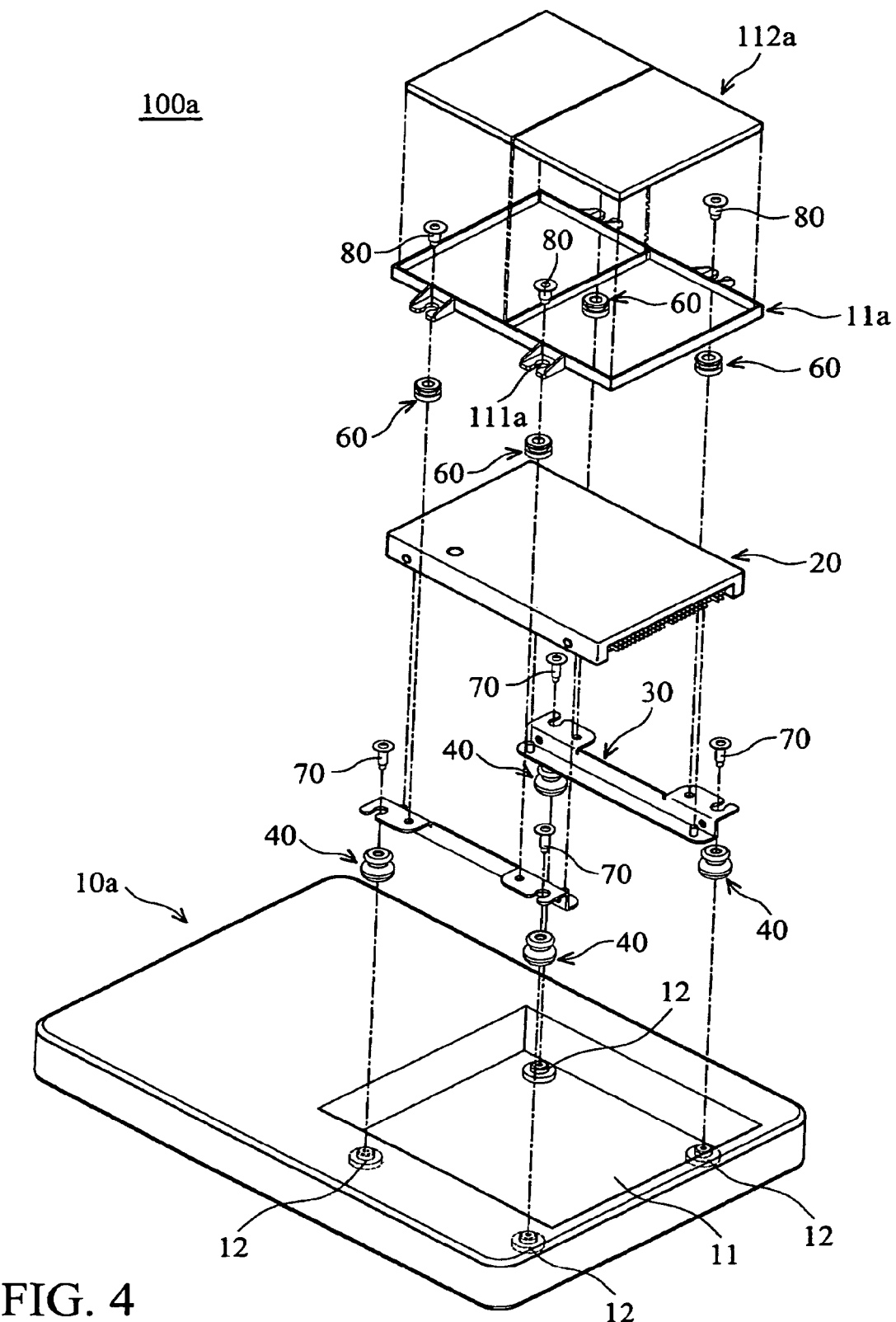
FIG. 4 is an exploded view of a portable computer as disclosed in a second embodiment of the invention.

FIG. 4 is a schematic view of a portable computer 100a as disclosed in a second embodiment of the invention. The portable computer 100a further includes a second module 112a. In this embodiment, elements the same as those of the first embodiment are labeled with the same references, and their description is omitted. The second module 112a disposes to the frame 11a. In this embodiment, the frame 11a is the element minimally affected by vibration in the portable computer 100a, such as a battery frame for supporting batteries (the second module 112a). Hence, the totally weight of the frame 11a and the second module 11a is increased than the frame 50 in the first embodiment. The effect of vibration absorption is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable computer comprising:
   a body, having a receiving portion;
   a module, having two opposite sides and disposed in the receiving portion of the body, wherein the module generates vibration when acting;
   a supporting member, disposed on one side of the module;
   an isolator, disposed on the supporting member to connect to the receiving portion of the body, wherein the isolator isolates the vibration from the body;
   a frame, disposed on another side of the module;
   a damper, disposed on the frame to connect to the supporting member, wherein the damper absorbs the vibration and transmit to the frame;
   a first fixed member passing through the isolator to fix the module to the body; and
   a second fixed member passing through the damper to fix the frame to the supporting member;
   wherein the second fixed member is a screw and the supporting member comprises a screw hole, the damper comprises a through hole corresponding to the screw hole, and the screw enters into the screw hole via the through hole.

2. The portable computer of claim 1, wherein the first fixed member is a screw and the body comprises a screw hole, the isolator comprises a through hole corresponding to the screw hole, and the screw enters into the screw hole via the through hole.

3. The portable computer as claimed in claim 1, wherein coefficient of damping of the isolator is higher than that of the damper.

4. The portable computer as claimed in claim 1, wherein coefficient of elasticity of the isolator is lower than that of the damper.

5. The portable computer of claim 1, wherein the supporting member comprises a notch to receive the isolator.

6. The portable computer of claim 5, wherein the isolator comprises a groove to combine with the notch.

7. The portable computer of claim 1, wherein the frame comprises a notch to receive the damper.

8. The portable computer of in claim 7, wherein the damper comprises a groove to combine with the notch.

9. The portable computer of claim 1, further comprises a second module disposed on the frame.

10. The portable computer of claim 9, wherein the second module is a battery.

* * * * *